United States Patent [19]

Molinari et al.

[11] 4,384,906
[45] May 24, 1983

[54] FLAT SHEET CLOSURE AND METHOD

[75] Inventors: Robert J. Molinari, Los Altos; Robert Parker, Alamo; Thomas D. Ratzlaff, Menlo Park, all of Calif.

[73] Assignee: Raychem Corporation, Menlo Park, Calif.

[21] Appl. No.: 300,522

[22] Filed: Sep. 9, 1981

[51] Int. Cl.³ .................. B29C 27/00; F16L 55/16; H02G 3/04
[52] U.S. Cl. .................................. 156/86; 138/99; 138/156; 138/167; 138/178; 156/49; 156/201; 156/215; 428/36; 174/DIG. 8; 174/92
[58] Field of Search ............... 156/49, 86, 201, 215; 174/DIG. 8, 92; 138/99, 156, 167, 178; 428/36

[56] References Cited

U.S. PATENT DOCUMENTS

| | | |
|---|---|---|
| 3,455,336 | 7/1969 | Ellis . |
| 3,467,761 | 9/1969 | Plummer ..................... 156/86 |
| 3,530,898 | 9/1970 | Wilson ....................... 138/167 |
| 3,542,077 | 11/1970 | Muchmore ............... 174/DIG. 8 |
| 3,574,313 | 4/1971 | Tanaka ..................... 174/DIG. 8 |
| 3,847,721 | 11/1974 | Evans ...................... 174/DIG. 8 |
| 3,910,448 | 10/1975 | Evans et al. ............... 174/DIG. 8 |
| 4,083,087 | 4/1978 | Hale . |
| 4,219,051 | 8/1980 | D'Haeyer . |
| 4,237,174 | 12/1980 | Lagardere et al. ........ 174/DIG. 8 |
| 4,241,119 | 12/1980 | Smart ......................... 156/86 |
| 4,283,239 | 8/1981 | Corke et al. ................ 156/86 |

FOREIGN PATENT DOCUMENTS

| | | |
|---|---|---|
| 23418 | 7/1980 | European Pat. Off. . |
| 1003314 | 2/1957 | Fed. Rep. of Germany ........ 174/92 |
| 2334429 | 1/1975 | Fed. Rep. of Germany ........ 174/92 |
| 2820181 | 11/1979 | Fed. Rep. of Germany ........ 174/92 |
| 2422275 | 11/1979 | France .................... 174/DIG. 8 |
| 7508247 | 7/1974 | Netherlands .................. 174/92 |
| 505013 | 5/1939 | United Kingdom .............. 174/92 |

Primary Examiner—William R. Dixon, Jr.
Attorney, Agent, or Firm—Douglas A. Chaikin; Herbert G. Burkard

[57] ABSTRACT

A method for holding together the opposing ends of a flat sheet wrapped around an elongate substrate employs one or more closure devices, each closure device comprising a pair of frictional elements and a means for interengaging same. The frictional elements each have a channel member having a slit and a rod member positionable within said channel member, which when so positioned cooperates therewith to provide a conduit thereinbetween and to apply frictional forces to one end of the flat sheet when the end has been inserted through the slit and is in position between the rod member and the channel member. The closure is especially suited for joining elastomeric flat sheet, the sheet and closure device or devices collectively providing a protective closure.

33 Claims, 19 Drawing Figures

FIG_1

FIG_2A

FIG_3A

FIG_2B

FIG_3B

FIG_4A

FIG_5A

FIG_4B

FIG_5B

FIG_6A

FIG_6B

FIG_6C

FIG_7

FIG_8A

FIG_8D

FIG_8B

FIG_8E

FIG_8C

FIG_8F

FLAT SHEET CLOSURE AND METHOD

BACKGROUND OF THE INVENTION

1. Field of the Invention

This invention relates to protecting an elongate substrate, and more particularly to a method of protecting an elongate substrate with a flat sheet wrapped therearound and held together by a novel flat sheet closure device.

2. Discussion of the Prior Art

Wraparound sleeves are widely used as protective closures in the pipe, electrical power distribution, and telecommunication industries for environmentally sealing, electrically insulating and/or strengthening the pipe, conduit, or cable. Numerous wraparound sleeve closures and methods are known in the art. One class of closures is a flat sheet which has been overlappingly wrapped with no additional parts being required to effect the closure. Unwrapping is prevented by such means as, for example, adhesive bonding, internal forces causing the edges to cooperatively curl together, and/or internal forces reinforcing the wraparound, such as a high degree of friction from multiple turns upon wrapping. The strength and effectiveness of such closures is often marginal and such closures can be difficult to install under typical conditions of use.

A second class of flat sheet closures consists of those having additional closure parts. These additional parts may be either, for example, a self-adhesive patch, a clamp that holds the two sheet ends separately, or a clamp system that holds the two sheet ends in overlapping frictional contact, such as, a buckle system. Clamp configurations which hold the two sheet ends separately often have barbs, teeth or other such projections which can perforate the sheet and may induce tearing thereof. This is a problem for polymeric sheets and especially for elastomeric sheets. Dimensionally-recoverable sheets generate large forces on recovery tending to cause the separation of the sheet ends joined by these clamps. Separation of parts and tearing pose difficult design problems generally unsolved by the prior art. These problems are compounded by other factors, such as, the lack of protection of the elongate substrate under the clamp and the possibility of air being trapped under the clamp thereby creating a channel leak path through which water may penetrate and corrode or electrically short-out the substrate to be protected or insulated.

An example of a clamp system that holds the two sheet ends in overlapping frictional contact is given in U.S. Pat. No. 4,083,087 to C. Clark Hale, herein incorporated by reference. Hale discloses two pins around which the opposing ends of a flat band are wrapped in opposing directions and which are locked into place by means of an elongate channel clipped or slid thereover. A basic omega closure is taught in U.S. Pat. No. 4,219,051 to A. H. L. D'Haeyer, herein incorporated by reference, in which two sheets are overlapped around a rod in opposing directions and are clamped between the rod and a C-shaped channel. Such closures are prone to slippage of the lapped sheet, especially if the sheet is a dimensionally-recoverable sheet, most especially if the sheet is a heat-shrinkable sheet.

A third class of sheet closures consists of those having profiles. Profiles may be continuous or discontinuous. Continuous profiles, such as a grooved sheet edge, are typically extruded with the sheet. Discontinuous profiles, such as cut interlocking sheet edge shapes, are typically machined such as by cutting. Profiled sheets are hence more expensive to manufacture and must be inventoried and sold in sizes, but do offer improved strength, especially if combined with additional parts.

U.S. Pat. No. 3,455,366 to R. H. Ellis, herein incorporated by reference, is one example of a "rail and channel" closure, i.e. a sheet having abuttable opposing edges, each edge having an elongate ridge profile, collectively forming a rail when the sheet is wrapped around a pipe to abut the edges, which rail may be fastened by slipping a flexible channel thereover. Although a strong closure is obtained, installation of the channel can be difficult for closures of long length because of the frictional drag of a long length of channel.

European Patent Publication No. 23,418 to A. C. Egerton Limited, herein incorporated by reference, discloses in part a "rail and channel" type closure having a pair of channels, which clip together, each channel fitting over a profiled edge. The channels in such a design can be preassembled at the manufacturing facility and hence the installation difficulty of running a long channel in the field is largely eliminated. The sheets must be manufactured, inventoried and sold in sizes determined by the rail position. Disclosed also by Egerton is a flat sheet closure which clips together and features tabs folded down from a pair of perforated strips, which tabs pierce the sheet near its opposing edges to grip it. One such strip is placed along each of the pair of opposing sheet ends, the strip terminating along its long edge in a mateable clipping arrangement. Piercing or perforating polymeric sheets may be acceptable for some applications, but when elastomeric sheets or dimensionally-recoverable sheets, especially heat-shrinkable sheets are used tearing can result.

SUMMARY OF THE INVENTION

We have now discovered a method for holding together the opposing ends of a flat sheet wrapped around an elongate substrate which employs a novel closure device which overcomes the difficulties unresolved by the prior art. Uniquely applied frictional forces grip the ends of the flat sheet, even elastomeric or heat-shrinkable flat sheet, so adequately that protuberance profiles are unnecessary. The sheet is not penetrated in any way according to our method and hence tearing is not a problem. The frictional nature of the fit allows the sheet to be cut to any size by the user. And perhaps most advantageously, our closure device is flexible enough to accommodate even large transitions in pipe, cable or conduit diameter.

In one aspect, the present invention provides a method of protecting an elongate substrate, comprising the steps of:
(a) providing a flat sheet having opposing ends;
(b) providing one or more flat sheet closure devices for holding together the opposing ends of said flat sheet, each flat sheet closure device comprising:
  (i) a first frictional gripping element;
  (ii) a second frictional gripping, said first and second elements each having:
    (1) a channel member having a slit, which slit is sufficiently wide to accommodate the thickness of said flat sheet and extends along the entire length of said channel member; and
    (2) a rod member which is at least as long as said channel member and which is positionable within said channel member and when so positioned, cooperates therewith to provide a conduit thereinbetween and to apply frictional forces to one end of the flat sheet when the end has been inserted through said slit and is in position between the rod member and the channel member; and (iii) a means for interengaging said first and second gripping elements;

(c) inserting one end of said sheet through the first frictional gripping element of each closure device and inserting the opposing end of said flat sheet through the second frictional gripping element of each closure device;

(d) wrapping said flat sheet circumferentially around said elongate substrate; and (e) interengaging said first and second frictional gripping elements.

In another aspect, the instant invention provides a flat sheet closure device for holding together the opposing ends of a flat sheet wrapped around an elongate substrate comprising:

(a) a first frictional gripping element;

(b) a second frictional gripping element, said first and second elements each having:

(i) a channel member having a slit, which slit is sufficiently wide to accommodate the thickness of said flat sheet and extends along the entire length of said channel member; and (ii) a rod member which is at least as long as said channel member and which is positionable within said channel member and when so positioned, cooperates therewith to provide a conduit thereinbetween and to apply frictional forces to one end of the flat sheet when the end has been inserted through said slit and is in position between the rod member and the channel member; and (c) a means for interengaging said first and second frictional gripping elements.

In a further aspect, the present invention provides a protective closure for an elongate substrate comprising:

(a) a flat sheet composed of a material which is sufficiently flexible to be wrapped around an elongate substrate and which has opposing ends; and (b) one or more flat sheet closure devices, each closure device comprising a pair of frictional gripping elements and a means for interengaging said frictional gripping elements, each frictional gripping element having:

(i) a channel member having a slit, which slit is sufficiently wide to accommodate the thickness of said flat sheet and extends along the entire length of said channel member; and (ii) a rod member which is at least as long as said channel member and which is positionable within said channel member and when so positioned, cooperates therewith to provide a conduit thereinbetween and to apply frictional forces to one end of the flat sheet when the end has been inserted through said slit and is in position between the rod member and the channel member.

BRIEF DESCRIPTION OF THE DRAWING

The invention may be better understood by refering to the detailed description of the invention when taken in conjunction with the accompanying drawing in which:

FIG. 4A is a cross-sectional view of yet another closure device according to this invention showing the means for interengaging the gripping elements as a hinge joint having interdigitatable, spaced, cylindrical segments with a channel and a pin inserted there through.

FIG. 8, views A-F, show in cross-section a variety of ways in which a flat sheet may be inserted through a closure device according to this invention.

DETAILED DESCRIPTION OF THE INVENTION

Figure 1:
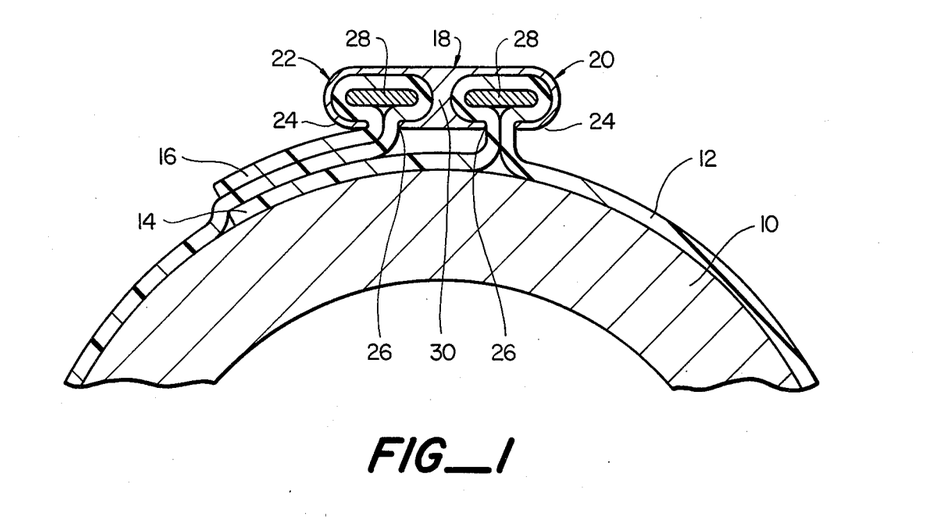
FIG. 1 is a partial cross-sectional view of a pipe around which has been wrapped a flat sheet, the opposing ends of which have been inserted through one of the closure devices according to this invention.

Referring to the drawing, FIG. 1 illustrates in partial cross-section a pipe 10 around which has been wrapped a flat sheet 12. The opposing ends 14 and 16 of the flat sheet 12 have been inserted through a closure device 18 according to this invention thereby collectively providing a protective closure. The closure device 18 has a first frictional gripping element 20 and a second frictional gripping element 22. Each frictional gripping element 20, 22 has a channel member 24 (shown here as having but not being limited to an elliptical interior cross-section), which channel members 24 each have a slit 26 (shown as an elongate slit) extending along the entire length of said channel member 24. Each frictional gripping element 20, 22 also has a rod member 28, which is at least as long as said gripping element 20 or 22 and which is positionable within said channel member 24 and when so positioned cooperates therewith to provide a conduit therebetween and to apply frictional forces to one end 14 or 16 of the flat sheet 12. The rod member 28 is shown here as having an elliptical cross-sectional shape so as to correspond to the elliptical cross-sectional shape of the interior of the channel member 24, but which is of smaller cross-sectional area so that the flat sheet 12 is insertable, but is frictionally gripped by an effective frictional fit.

Several methods for assembling the protective closure parts are possible. The rod member 28 may be placed within the channel member 24 and the sheet end 16 inserted through the slit 26 and around the rod member 28, the insertion operation aided by rotating the rod member 28 to help advance the sheet therethrough. Alternately the sheet end 16 may be folded over to form a loop, the loop inserted directly through the slit 26 into the channel member 20 or inserted by sliding the channel member 20 sideways over the looped sheet, followed by pushing the rod member 28 through the loop created by folding the sheet end 16. Moreover, as an additional insertion example, if the slit 26 is at least as wide as the diameter of the rod member 28, then the sheet end 16 may be folded over the rod member 28 and that subassembly pushed or snapped through said slit 26 together.

FIG. 1 also shows the gripping elements 20 and 22 as being connected by an integral connecting bridge 30 extending from the outer surface of the first gripping element 20 to the outer surface of the second gripping element 22, thus providing a means for interengaging the gripping elements 20 and 22. The integral connecting bridge 30 permanently joins and holds the gripping elements 20 and 22 in a fixed spatial relationship. Alternately as shown in other figures, the gripping elements 20 and 22 may have means for interengaging which do not permanently join the elements, but which allow the elements to be engaged and thereby placed in a fixed spatial relationship, or disengaged at will. The ability to disengage and to subsequently re-engage is an asset for protective closure applications where re-entry is advantageous.

The closure devices 18 of this invention are capable of holding together the opposing ends of flat sheets 12, which may be but are not limited to, polymeric sheets, dimensionally-recoverable polymeric sheets, (i.e. those which have a shape memory, such as those which are heat-shrinkable from a stretched heat-unstable configuration to a remembered heat-stable configuration), an elastomeric sheet such as neoprene, a sheet of metal, a foraminous sheet, a foraminous sheet having laminated thereto one or more sheets of polymeric material, a foraminous sheet such as a fabric sheet of woven fiber glass which has been impregnated, for example, with an organic material, or a laminated sheet composed of one or more layers in combination of any of the foregoing. Wrap-around sleeves of these materials are generally used as protective closures for environmentally sealing, electrically insulating and/or strengthening the pipe, conduit, or cable, and as such generally have layers of mastic or adhesive, such as a hot-melt adhesive coated thereon. Although not shown in the drawing, use of such mastic or adhesive layers is contemplated by this invention.

Recognized and contemplated by this invention also is that the frictional force requirements will vary with the user's application specifications and/or the materials used. Hence it is recognized that the frictional gripping elements of this invention must be and are tailorable to the user's application. The geometries of the closure device elements, the materials used in fabrication (metals or polymers, for example) and the textures of the surfaces of the various elements, are examples of variable design factors.

Figure 2A:
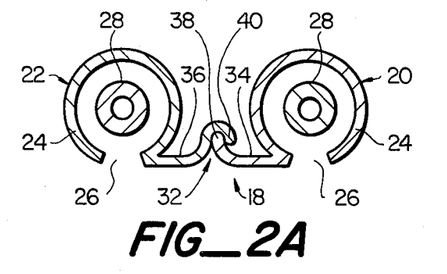
FIG. 2A is a cross-sectional view of another of the closure devices according to this invention showing a pair of gripping elements and a means for interengaging said gripping elements which is a clasp having portions which are bent in opposing senses to one another.

FIG. 2A illustrates in cross-section one of the interengagable closure devices 18 according to this invention which may be disengaged. The gripping elements 20 and 22 have channel members 24 which are shown as circular in cross-section and which have slits 26 extending the length thereof. The rod members 28 are shown as having a circular cross-section and are hollow. This is expecially valuable when the rod members 28 or the entire closure device 18 is fabricated from a polymeric material, because the hollow rod members 28 may then be quite flexible, which advantage will be discussed later. The means for interengaging the gripping elements 20 and 22 is a mateable clasp 32 (shown as but not limited to being an elongate clasp) having a first clasp portion 34 and a second clasp portion 36, which portions are bent in opposing senses to one another. The first clasp portion 34 extends from the outer surface of the first gripping element 20 toward the second gripping element 22 and bends upwardly away from the elongate substrate at its tip 38. The second clasp portion 36 extends from the outer surface of the second gripping element 22 toward the first gripping element 20 and bends downwardly toward the elongate substrate at its tip 40. When interengaged these two clasp portions (34, 36) form the mateable clasp 32. Once assembled, this clasp 32, if fabricated from appropriate materials, such as a metal which yields, may be crimped at one or more points along its length, thereby permanently joining and holding said gripping elements 20 and 22 in a fixed spatial relationship. Crimping renders the installation permanent, the closure device 18 no longer being disengageable.

Figure 2B:
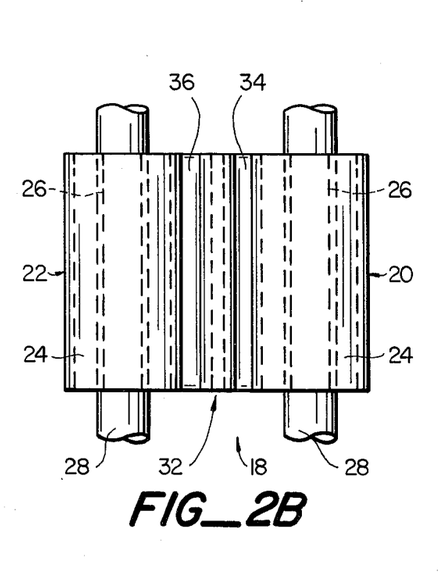
FIG. 2B is a top view of the closure device shown in FIG. 2A.

FIG 2B is a top view of the closure device shown in FIG. 2A. The rod members 28 are shown as extending beyond the extremities of the gripping elements 20 and 22 to demonstrate that the closure devices 18 may be used for more than just a narrow flat sheet or band. Every embodiment of these closure devices 18 may be fabricated to accommodate, with reference to the elongate substrate, flat sheets 12 having any longitudinal width and any circumferential length. It is preferable that the entire length of each end of the opposing sheet ends be in contact with a rod member 28, most preferably the same rod member 28. Where one closure device 18 extends the full longitudinal width of the sheet ends, the rod member 28 will also extend the full longitudinal width. Where several closure devices 18 are spaced along the longitudinal width of the sheet 12, the same rod members are preferably used for all, said rod members 28 then extending the full longitudinal width of the sheet end. The latter arrangement, especially if employed with a flexible rod member, affords improved flexibility to the collective protective closure, which is especially advantageous if large transitions in pipe diameter must be accommodated.

Figure 3A:
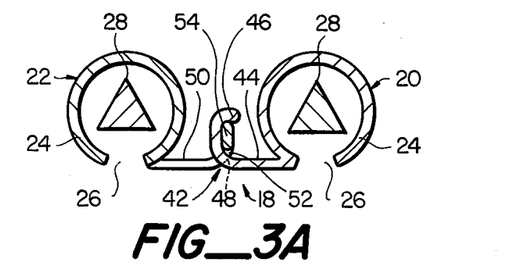
FIG. 3A is a cross-sectional view of another embodiment of a closure device according to this invention showing the means for interengaging said gripping elements to be a latch having two portions, a first latch portion having a notch and a second latch portion having a neck portion which terminates in a bar, the neck portion of the one being adapted to slide through the notch of the other.
Figure 3B:
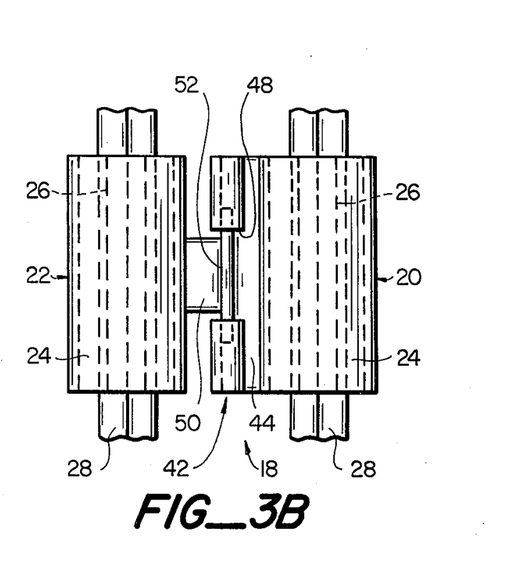
FIG. 3B is a top view of the closure device shown in FIG. 3A.

With reference to FIG. 3A, a cross-sectional view of another embodiment of a closure device 18 according to this invention is shown. A mateable latch 42 provides the means for interengaging the first frictional gripping element 20 and the second frictional gripping element 22. A first latch portion 44 extends from the outer surface of the channel member 24 of the first gripping element 20 toward the second gripping element 22, bends upwardly away from the elongate substrate at its tip 46 and has one notch 48 along its length. The second latch portion 50 extends from the outer surface of the channel member 24 of the second gripping element 22 toward the first gripping element 20 and has a neck portion 52 and a bar member 54. The neck portion 52 extends from the outer surface of the second gripping element 22 and perpendicularly joins the bar member 54 to form a T. The neck portion 48 of the second latch portion 50 is adapted to slide through the notch 48 in the first latch portion 44. A plurality of such mateable latches may be desireable for each closure device. For shorter closure devices 18 having lengths on the order of 2 inches, one mateable latch 42 is believed sufficient for most applications.

With continuing reference to FIG. 3A, the rod members 28 are shown as having equilaterally triangular cross-sections. Such a non-circular rod member geometry, when combined with a channel member 24 having a circular interior cross-section, for example, increases the frictional forces that a flat sheet inserted through the closure device 18 experiences. The same increase in frictional forces is expected when rod members having circular cross-sections are combined with channel members having non-circular interior cross-sections. Other combinations of geometries are contemplated by this invention although and hence these examples are not to be considered limiting. The elliptical rod member of FIG. 1 is a low profile shape and is especially suited for elastomeric sheet materials or others which may be cinched-up, which cinching-up is accomplished by pulling the sheet tautly through the closure device 18. The triangular rod member shown in FIG. 3A, or any other cross-sectional shape characterized by angularity, such as, a hexagon, a square, a rectangle, a right triangle, or even a generally round rod member having an axial undercut (shown in FIG. 6A), etc., may be employed to increase the frictional forces to which the flat sheet inserted through the closure device 18 is subjected. Frictional forces may also be increased by texturing the inner surface of the channel member 24 or by texturing the exterior of the rod member 28, such as by scoring with longitudinal grooves, scoring a cross-hatched pattern, coating these surfaces with a high-frictional material such as a rubbery elastomer, or gluing or laminating to the surfaces a high-frictional material such as a Velcro ® layer (not shown).

Figure 4A:
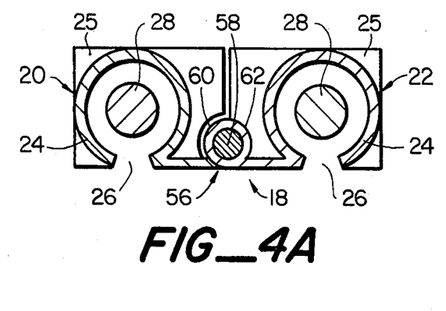

FIG. 4A is a cross-sectional view of yet another closure device 18 according to this invention. Stiffening members 25 are shown extending from the outer surfaces of the channel members 24. The means for interengaging the first gripping element 20 and the second gripping element 22 is an interdigitating joint, shown as a hinge joint, having interdigitatable, spaced segments, which have a longitudinal channel therethrough, and a pin 58 insertable through said channel.

The first gripping element 20 is shown as having two spaced segments 60 attached to the outer surface of its channel member 24 which faces the second gripping element 22, although any number of segments is contemplated. These segments 60 extend in a direction which is parallel to the slit 26. The second gripping element 22 is shown as having one spaced segment 62 attached to the outer surface of its channel member 24 which faces the first gripping element 20, although any number of segments is contemplated. The segment 62 extends in a direction which is parallel to the slit 26, the spacing of the segments 60, (shown here as but not limited to cylindrical segments), allowing interdigitation thereof and allowing permanent engagement in a fixed spatial relationship by insertion of pin 58 therethrough.

Figure 4B:
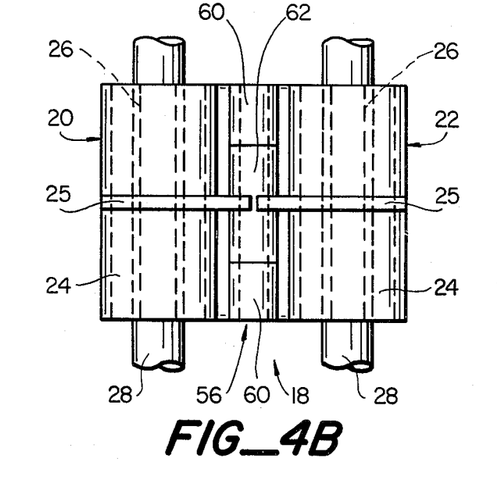
FIG. 4B is a top view of the closure device shown in FIG. 4A.

FIG. 4B is a top view of the closure device shown in FIG. 4A. As an example, when the flat sheet is a ⅛ inch thick sheet of neoprene, the slit 26 may be ¼ inch wide, the inside diameter of the channel member 24 may be ½ inch and the outside diameter of the rod member 28 may be ¼ inch.

Figure 5A:
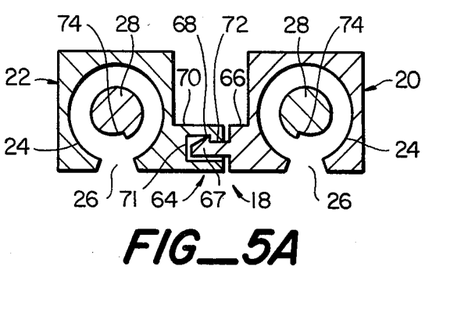
FIG. 5A shows in cross-section another means for engaging the gripping elements of a closure device according to this invention which is a snap-lock closure in which a female cavity with a constricted aperature cooperates with a male protuberance having a barb to impede the removal of the male once it is interengaged with the female.

Referring to FIG. 5A, shown in cross-section is a snap-lock closure as the means for interengaging the frictional gripping elements 20 and 22 of a closure device 18 according to this invention. A male member 66 extends from the outer surface of the channel member 24 of the gripping element 20 toward the gripping element 22. The channel member 24 is shown as having been machined in a block of polymeric material, although a variety of materials and fabrication methods are contemplated by this invention. The male member 66 has a protuberance 67 with a barb 68, which barb 68 impedes the removal of the male member 66 once it is interengaged with a female member 70. The female member 70 has a cavity 71 with a constricted aperature 72, through which the protuberance 67 and its barb 68 barely pass, (i.e. a press-fit) and which constricted aperature 72 cooperates with the barb 68 of the male member 66 to impede the removal of the male member 66 once it is interengaged with the female member 70. The cavity 71 is shown as a generally rectangular box having a rectangular aperature 72. It could be a longitudinal groove extending parallel to the slit 26 and having a length of up to the length of said slit 26. Alternatively it could take other shapes. The male member 66 is shown as a wide rectangular protuberance 67 with a barb 68. It's width could extend the length of the slit 26. It also could assume other shapes provided that they are compatible with the female member 70.

The rod members 28 are shown as having generally circular cross-sections, but with an axial undercut 74 as previously discussed, for the purpose of increasing the frictional forces to which the flat sheet inserted through the closure device 18 is subjected. More than one axial undercut 74 may be employed for each rod member 28. These axial undercuts 74 will generally extend substantially along the entire length of the rod member 28.

Figure 5B:
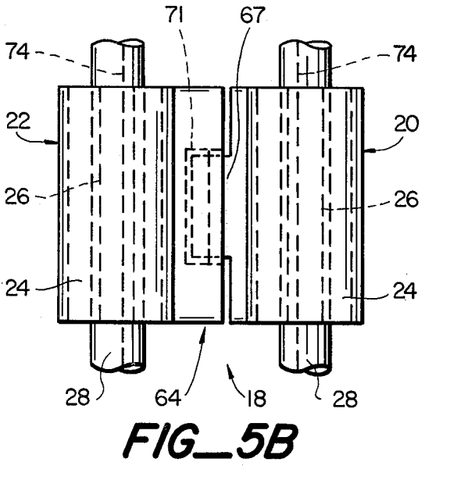
FIG. 5B is a top view of the closure device shown in FIG. 5A.

FIG. 5B is a top view of the closure device 18 shown in FIG. 5A. One snap-lock closure 64 is shown although more than one snap-lock closure for each closure device may be advisable for some applications, such as when the closure device has a long length.

Figure 6A:
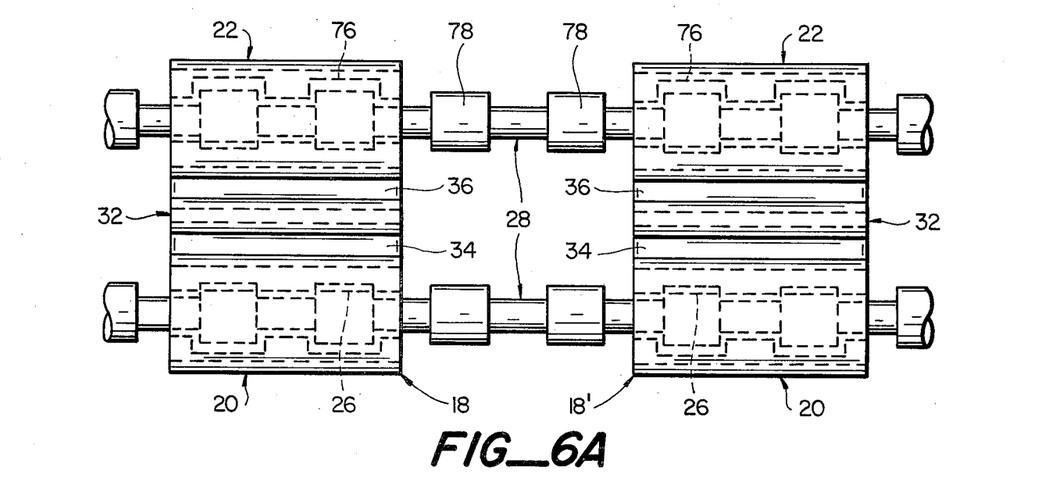
FIG. 6A is a top view of a pair of yet another closure device according to this invention in which the slits of the channel members have contoured edges which accommodate a rod member having a variable diameter, such that it may be inserted laterally through said edge contour and once inserted, may be advanced longitudinally within the channel member to a point as shown where it cannot be laterally removed thereby insuring retention.

With reference to FIG. 6A, a top plan view of a pair of closure devices 18 and 18' according to this invention are shown with long rod members 28 having variable diameters. The slits 26 of the channel members 24 have one contoured edge 76, shown better in FIG. 6C, although one or the other or both of the edges of each slit 26 may be contoured. The shape defined by the edge contour shown in FIG. 6C as a curved rectangular shape, is such that it coordinates with the shape defined by the rod member 28 having a variable diameter, shown in FIG. 6C, for example, as spaced cylinders 78 along a rod of smaller diameter. The diameter of the rod members 28 at their widest point exceeds the width of the slit 26 at its widest point and hence the rod members 28 in this embodiment are not insertable directly through the slits 26, but rod members 28 may be inserted laterally through the contoured edges 76 of the gripping elements 20 and 22 respectively. Once inserted, the rod members 28 may be advanced longitudinally within the channel members 24 to a point where they cannot be laterally removed, thereby insuring retention.

Each end 14, 16 of the flat sheet may be folded around a rod member 28 and inserted laterally by pushing the subassembly through the contoured edge 76 and into the channel member 24. Alternately each sheet end 14, 16 may be inserted through the slit 26 of the channel member 24 after the rod member 28 has been inserted laterally through the contoured edge 76 and is already present within the channel member 24, and inserted around said rod member 28, optionally assisted by rotating the rod member 28. As a third option, each sheet end 14, 16 may be inserted through the slit 26 by first folding the sheet end over to form a loop. Once the looped sheet end is present in the channel member 24, a rod member 28 may be pushed or pulled through the subassembly. The term "inserted" is meant to include any of the foregoing acts or combination of acts.

Figure 6B:
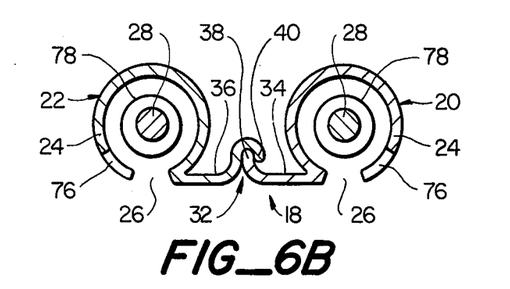
FIG. 6B is a cross-sectional view of the pair of closure devices of FIG. 6A.
Figure 6C:
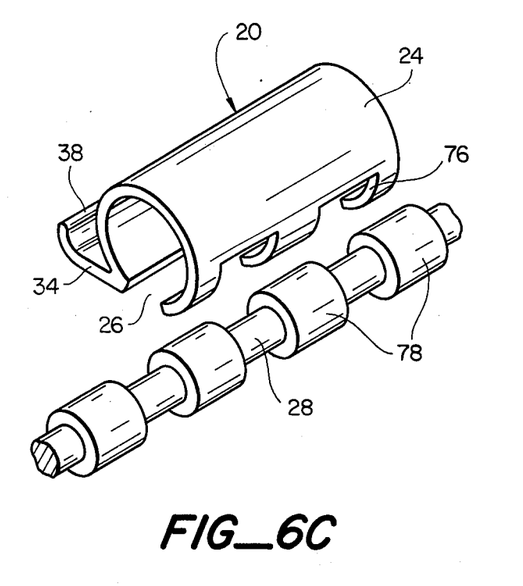
FIG. 6C is a perspective view of one half of a closure device of FIGS. 6A and 6B, showing one channel member and one rod member as the rod member is being laterally inserted and showing the contoured edge of the slit more clearly.

FIG. 6B is a cross-sectional view of the pair of closure devices 18 of FIG. 6A. The means for interengaging the gripping elements 20 and 22 is shown as a mateable clasp 32 as shown and discussed previously for FIG. 2A, although any of the clasps according to this invention could probably be used interchangably for most applications. The clasps shown are optionally crimpable as previously discussed.

Figure 7:
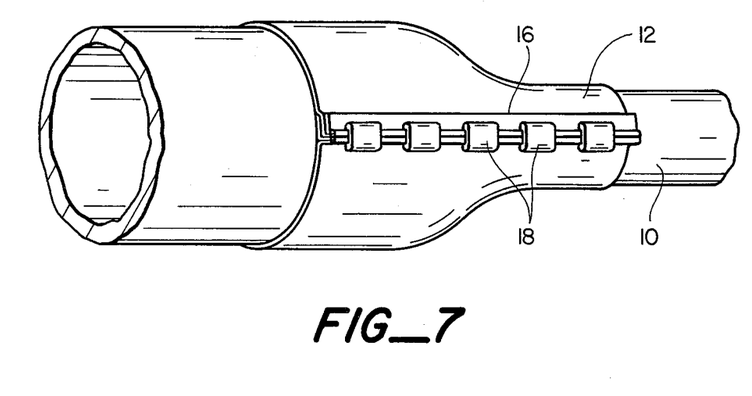
FIG. 7 is a perspective view showing a plurality of the closure devices according to this invention holding together the opposing ends of a flat sheet which has been wrapped around a pipe having a large transition in diameter.
Figure 8A:
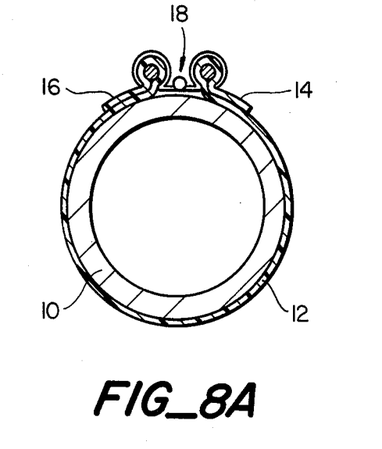
Figure 8B:
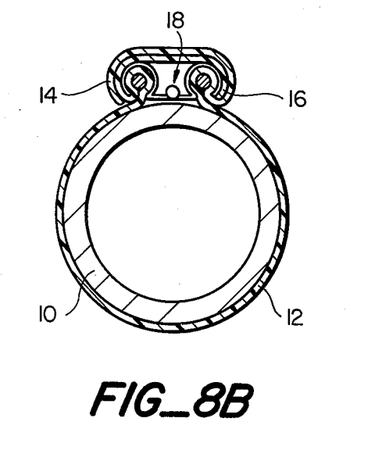
Figure 8C:
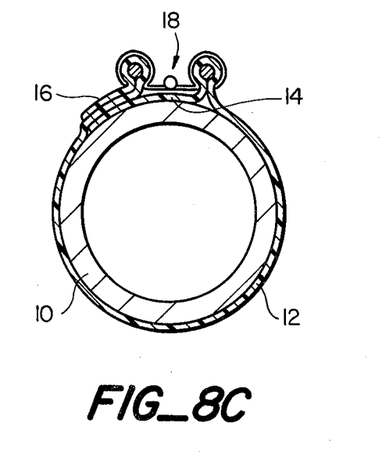
Figure 8D:
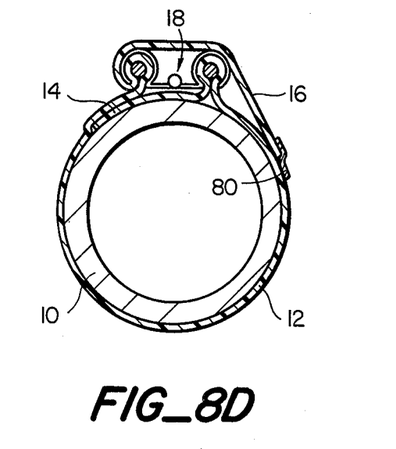
Figure 8E:
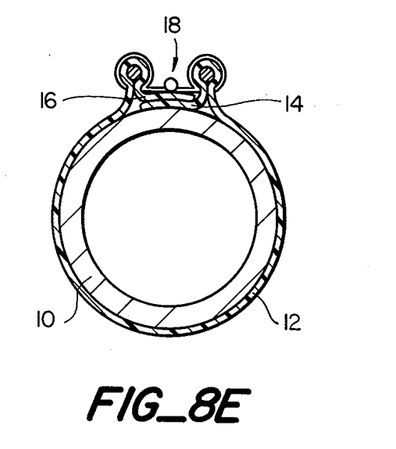
Figure 8F:
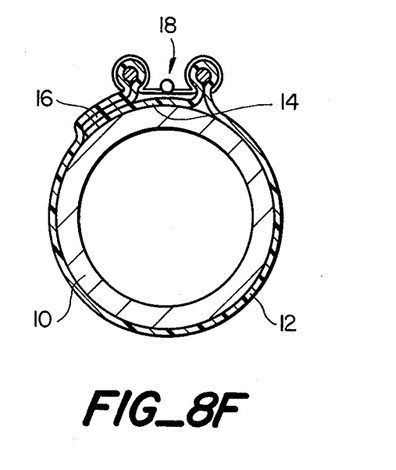

With reference to FIG. 7, shown is a perspective view of a plurality of the closure devices 18 according to this invention holding together the opposing ends of a flat sheet 12 which has been wrapped around a pipe 10 having a large transition in diameter. The ends of sheet 12 were inserted through the first and second frictional gripping elements 20 and 22 respectively, of each closure device 18 either by folding the end around the rod member 28 and inserting it through the slit 26, or by folding the end and inserting it through the slit followed by the insertion of the rod member therethrough or by any other insertion method. The flat sheet 12 is then wrapped circumferentially around the elongate substrate, the pipe 10, and the respective first and second frictional gripping elements 20 and 22 for each closure device 18 are interengaged by means of any of the means of interengaging taught by this invention, i.e. clasps, latches, snap-locks, interdigitating joints, etc. The flat sheet 12 is caused to come into intimate contact with the pipe 10 by, for example, cinching-up on the sheet ends 14 and 16, accomplished by pulling them tautly through the closure devices 18. Alternately where an elastomeric flat sheet 12 is employed as part of the protective closure, the elastomeric sheet could have been previously stretched and the intimate contact with the pipe 10 achieved by allowing the elastomeric sheet to relax and shrink into intimate contact therewith. An example of the use of an elastomeric marterial for enclosing an elongate substrate such as a pie can be found, for example, in U.S. Pat. No. 4,135,553 to J. H. Evans et al, herein incorporated by reference. Where the flat sheet 12 is a dimensionally-recoverable polymeric material the flat sheet 12 may be caused to dimensionally-recover, for example, where the dimensionally-recoverable polymeric sheet is heat-shrinkable, the sheet may be caused to come into intimate contact with the pipe 10 by the application of heat.

FIG. 8, views A through F show in cross-section, a variety of ways in which a flat sheet 12 may be inserted through the closure devices 18 according to this invention. The insertion arrangement in FIG. 8A is preferred for applications requiring that the sheet be cinchable, such as where a foraminous sheet (a woven fiberglass sheet) is used to bundle and strengthen a cable or conduit. Once cinched, the ends 14 and 16 as shown in FIG. 8B may be brought over the closure device 18 and secured together such as by means of an adhesive. FIG. 8C shows a most preferred method of inserting the sheet 12. Sheet end 14 has been underlapped, thereby protecting the elongate substrate underneath of the closure device 18. The opposing sheet end 16 is free and may be drawn over and around the closure device 18 as shown in FIG. 8D. When sealed by an adhesive or mastic or by means of a patch or tape as shown at 80, the closure device 18 is itself protected from the environment. In FIG. 8E both of the sheet ends 14 and 16 have been underlapped, thereby affording the maximum amount of protection for the elongate substrate underneath. Once the flat sheet 12 is in place, the closure device 18 may be removed, an advantage for some applications. Once the closure device 18 has been removed the protruding portions of flat sheet 12 which were threaded therethrough may be flattened down and secured such as by mastic, an adhesive, or by a patch or a strip of tape. The insertion arrangement of FIG. 8F is also one which affords a great deal of protection to the underlying elongate substrate while allowing the closure device 18 to be removed if the application so warrants, once the flat sheet is completely in place.

While the instant invention has been described by reference to what is believed to be the most practical embodiments, it is to be understood that the invention may embody other specific forms not departing from the spirit of the central characteristics of the invention. It should be understood that there are other embodiments which possess the qualities and characteristics which would generally function in the manner and should be considered within the scope of this invention. The present embodiments therefore should be considered in all respects as illustrative and not restricted, the scope of the invention being limited solely to the claims rather than the foregoing description and all equivalents thereto being intended to be embraced therein.

We claim:

1. A flat sheet closure device for holding together the opposing ends of a flat sheet to be wrapped around an elongate substrate, comprising:
 (a) a first frictional gripping element;
 (b) a second frictional gripping element, said first and second elements each having:
  (i) a channel member having a slit, which slit is sufficiently wide to accommodate the thickness of said flat sheet and extends along the entire length of said channel member; and (ii) a rod member which is at least as long as said channel member and which is positionable within said channel member and when so positioned, cooperates therewith to provide a conduit thereinbetween and to apply frictional forces to one end of the flat sheet when the end has been inserted through said slit and is in position between the rod member and the channel member; and (c) a means for interengaging said first and second frictional gripping elements.

2. The closure device according to claim 1, wherein the means for interengaging said first and said second frictional gripping elements comprises an integral connecting bridge extending from the outer surface of the first gripping element to the outer surface of the second gripping element, thereby permanently joining and holding said gripping elements in a fixed spatial relationship.

3. The closure device according to claim 1, wherein the means for interengaging said first and second frictional gripping elements comprises a mateable clasp having a first clasp portion and a second clasp portion, which portions are bent in opposing senses to one another, said first clasp portion extending from the outer surface of the first gripping element toward the second gripping element and bending upwardly away from the elongate substrate, said second clasp portion extending from the outer surface of the second gripping element toward the first gripping element and bending downwardly toward the elongate substrate, thereby forming said mateable clasp.

4. The closure device according to claim 3, wherein the mateable clasp is crimpable at one or more points along its length after said clasp portions are interengaged, thereby permanently joining and holding said gripping elements in fixed spatial relationship.

5. The closure device according to claim 1, wherein the means for interengaging said first and second frictional gripping elements comprises at least one mateable latch having a first latch portion and a second latch portion, said first latch portion extending from the outer surface of the first gripping element toward the second gripping element, bending upwardly away from the elongate substrate and having a notch along its length, said second latch portion having a neck portion and a bar member, said neck portion extending from the outer surface of the second gripping element toward the first gripping element, perpendicularly joining said bar member, and being adapted to slide through said notch, said bar member extending in a direction which is substantially parallel to the length of said second gripping element.

6. The closure device according to claim 1, wherein the means for interengaging said first and second frictional gripping elements comprises an interdigitating joint having interdigitatable, spaced segments, which segments have a longitudinal channel therethrough, and a pin insertable through said channel, said first gripping element having two or more spaced segments joined to the outer surface thereof which faces said second gripping element, said segments extending in a direction which is parallel to said slit, said second gripping element having at least one spaced segment joined to the outer surface thereof which faces said first gripping element, said at least one segment extending in a direction which is parallel to said slit, the placement and spacing of the segments of the first and second gripping elements allowing interdigitation thereof.

7. The closure device according to claim 1, wherein the means for interengaging said first and said second frictional gripping elements comprises as least one snaplock closure having a male member and a female member which each extend from the outer surface of a gripping element toward one another respectively, said male member having a protuberance with a barb, which barb impedes the removal of the male member once it is interengaged with the female, said female member having a cavity with a constricted aperature through which the protuberance and barb barely pass and which constricted aperature cooperates with said barb to impede the removal of the male member once it is interengaged.

8. The closure device according to claim 1, wherein at least one of the channel members has a circular cross-section.

9. The closure device according to claim 8, wherein the corresponding rod member positionable within said circular cross-sectional channel member, has a circular cross-section.

10. The closure device according to claim 8, wherein the corresponding rod member positionable within said circular cross-sectional channel member, has a non-circular cross-section.

11. The closure device according to claim 1, wherein at least one of the channel members has a non-circular cross-section.

12. The closure device according to claim 11, wherein the corresponding rod member positionable within said non-circular cross-sectional channel member, has a non-circular cross-section.

13. The closure device according to claim 11, wherein the corresponding rod member positionable within said non-circular cross-sectional channel member, has a circular cross-section.

14. The closure device according to claim 1, wherein the rod member is flexible.

15. The closure device according to claim 1, wherein the slit in at least one of the channel members has at least one contoured edge and wherein the rod member positionable with said channel member having said at least one contoured edge, has a variable diameter which exceeds the width of the slit at its widest portion and which defines a shape, which shape is insertable laterally through said edge contour and which, once inserted, may be advanced longitudinally within the channel member to a point where it cannot be laterally removed to thereby insure retention.

16. The closure device according to claim 1, wherein at least a portion of the surface of the rod member is textured.

17. The closure device according to claim 1 or 16, wherein at least a portion of the interior surface of the channel member is textured.

18. A protective closure for an elongate substrate, comprising:

(a) a flat sheet composed of a material which is sufficiently flexible to be wrapped around an elongate substrate and which has opposing ends; and (b) one or more flat sheet closure devices, each closure device comprising a pair of frictional gripping elements and a means for interengaging said frictional gripping elements, each frictional gripping element having:

(i) a channel member having a slit, which slit is sufficiently wide to accommodate the thickness of said flat sheet and extends along the entire length of said channel member; and (ii) a rod member which is at least as long as said channel member and which is positionable within said channel member and when so positioned, cooperates therewith to provide a conduit thereinbetween and to apply frictional forces to one end of the flat sheet when the end has been inserted through said slit and is in position between the rod member and the channel member.

19. A protective closure according to claim 18 wherein the protective closure has more than one closure device and wherein a plurality of channel members cooperate with one rod member, which one rod member is at least as long as the combined lengths of said plurality of channel members.

20. A protective closure according to claim 18, wherein the flat sheet is comprised of an organic polymer.

21. A protective device according to claim 20, wherein the flat sheet is comprised of an elastomer.

22. A protective closure according to claim 21, wherein the elastomer is neoprene.

23. A protective closure according to claim 18, wherein the flat sheet is comprised of a sheet of dimensionally-recoverable polymeric material.

24. A protective closure according to claim 23, wherein the dimensionally-recoverable sheet is heat-shrinkable.

25. A protective closure according to claim 18, wherein the protective sheet is comprised of a sheet of metal.

26. A protective closure according to claim 18, wherein the protective sheet is comprised of a sheet of foraminous material.

27. A protective closure according to claim 26, wherein the foraminous sheet has laminated thereto one or more sheets of polymeric material.

28. A method of protecting an elongate substrate, comprising the steps of:
(a) providing a flat sheet having opposing ends;
(b) providing one or more flat sheet closure devices for holding together the opposing ends of said flat sheet, each flat sheet closure device comprising:
 (i) a first frictional gripping element;
 (ii) a second frictional gripping, said first and second elements each having:
  (1) a channel member having a slit, which slit is sufficiently wide to accommodate the thickness of said flat sheet and extends along the entire length of said channel member; and
  (2) a rod member which is at least as long as said channel member and which is positionable within said channel member and when so positioned, cooperates therewith to provide a conduit thereinbetween and to apply frictional forces to one end of the flat sheet when the end has been inserted through said slit and is in position between the rod member and the channel member; and
 (iii) a means for interengaging said first and second gripping elements;
(c) inserting one end of said sheet through the first frictional gripping element of each closure device and inserting the opposing end of said flat sheet through the second frictional gripping element of each closure device;
(d) wrapping said flat sheet circumferentially around said elongate substrate; and
(e) interengaging said first and second frictional gripping elements.

29. The method of claim 28, which further comprises the step of causing the flat sheet to come into intimate contact with said elongate substrate.

30. A method according to claim 29, wherein the flat protective sheet is comprised of a sheet of dimensionally-recoverable polymeric material and wherein said flat sheet is caused to come into intimate contact with said elongate substrate by causing dimensional recovery.

31. A method according to claim 30, wherein the dimensionally-recoverable polymeric sheet is heat-shrinkable and wherein the sheet is caused to come into intimate with said elongate substrate by the application of heat.

32. A method according to claim 29, wherein the flat sheet is caused to come into intimate contact with said elongate substrate by cinching-up on the sheet ends, which is accomplished by pulling the sheet tautly through said flat sheet closure devices.

33. A method according to claim 29, wherein the flat sheet is comprised of an elastomer, which method further comprises the step of stretching said elastomeric sheet, and wherein said stretched elastomeric sheet is caused to come into intimate contact with said elongate substrate by allowing said elastomeric sheet to relax and shrink into intimate contact therewith.

* * * * *

UNITED STATES PATENT AND TRADEMARK OFFICE
CERTIFICATE OF CORRECTION

PATENT NO. : 4,384,906

DATED : May 24, 1983

INVENTOR(S) : Robert Molinari et al.

It is certified that error appears in the above-identified patent and that said Letters Patent are hereby corrected as shown below:

In Column 2, line 5, "3,455,366" should read -- No. 3,455,336--.

In Column 3, line 63, "refering" should read --referring--.

In Column 6, line 25, "expecially" should read --especially--.

In Column 8, line 48, "It's" should read --Its--.

In Column 10, line 1, "marterial" should read --material--.

In Column 10, line 2, "pie" should read --pipe--.

In Claim 28, line 8, "gripping, said" should read --gripping element, said--.

In Claim 31, line 4, "into intimate with" should read --into intimate contact with--.

Signed and Sealed this

First Day of January 1985

[SEAL]

Attest:

GERALD J. MOSSINGHOFF

Attesting Officer

Commissioner of Patents and Trademarks